(12) United States Patent
Zeygerman

(10) Patent No.: US 10,744,595 B2
(45) Date of Patent: Aug. 18, 2020

(54) TRANSVERSAL LASER CUTTING MACHINE

(71) Applicant: TRUMPF Inc., Farmington, CT (US)

(72) Inventor: Leonid Zeygerman, West Hartford, CT (US)

(73) Assignee: TRUMPF INC., Farmington, CT (US)

( * ) Notice: Subject to any disclaimer, the term of this patent is extended or adjusted under 35 U.S.C. 154(b) by 231 days.

(21) Appl. No.: 15/974,706

(22) Filed: May 9, 2018

(65) Prior Publication Data

US 2019/0344384 A1 Nov. 14, 2019

(51) Int. Cl.
| | |
|---|---|
| *B23K 26/08* | (2014.01) |
| *B23K 26/36* | (2014.01) |
| *B23K 26/50* | (2014.01) |
| *B23K 26/70* | (2014.01) |
| *B23K 26/10* | (2006.01) |

(52) U.S. Cl.
CPC .......... *B23K 26/0876* (2013.01); *B23K 26/10* (2013.01); *B23K 26/702* (2015.10)

(58) Field of Classification Search
CPC ......... B23K 26/08–082; B23K 26/0869–0892; B23K 26/36–389; B23K 26/50–57
See application file for complete search history.

(56) References Cited

U.S. PATENT DOCUMENTS

| | | | |
|---|---|---|---|
| 3,226,527 A * | 12/1965 | Harding | B23K 26/382 219/384 |
| 5,402,691 A | 4/1995 | Dworkowski et al. | |
| 6,140,606 A | 10/2000 | Heikilla et al. | |
| 6,825,439 B2 | 11/2004 | Leibinger et al. | |
| 6,835,912 B2 | 12/2004 | Leibinger et al. | |
| 9,044,826 B2 | 6/2015 | Epperlein et al. | |
| 2017/0157701 A1* | 6/2017 | Sercel | B23K 26/16 |
| 2017/0276703 A1* | 9/2017 | Chen | B23K 37/0235 |
| 2018/0111224 A1* | 4/2018 | Spiess | B23K 26/36 |
| 2018/0147657 A1* | 5/2018 | Shapiro | B32B 37/12 |
| 2018/0154475 A1* | 6/2018 | Fagan | B23K 37/0235 |
| 2018/0193964 A1* | 7/2018 | Joos | B23K 37/0235 |
| 2018/0354076 A1* | 12/2018 | Suzuki | B23K 26/0006 |

(Continued)

FOREIGN PATENT DOCUMENTS

| | | |
|---|---|---|
| CN | 101301724 A | 11/2008 |
| CN | 203031122 U | 7/2013 |

(Continued)

*Primary Examiner* — Michael A Laflame, Jr.
(74) *Attorney, Agent, or Firm* — Leydig, Voit & Mayer, Ltd.

(57) ABSTRACT

A laser cutting machine includes a first bearing structure and a second bearing structure, a first support structure and a second support structure, a bridge, and a laser head. Each of the first and second bearing structures includes a support structure interface. The first support structure is configured to engage the support structure interface of the first bearing structure and the second support structure is configured to engage the support structure interface of the second bearing structure. The bridge is attached to the first support structure at a first intermediate support region and to the second support structure at a second intermediate support region and is configured to move in a first direction. The laser head is configured to move along the bridge in a second direction.

20 Claims, 2 Drawing Sheets

(56) References Cited

U.S. PATENT DOCUMENTS

| | | | | |
|---|---|---|---|---|
| 2019/0105737 A1* | 4/2019 | Mikkelsen | ............. | B23K 26/38 |
| 2019/0111516 A1* | 4/2019 | Meyer | .................... | B23K 31/12 |
| 2019/0126393 A1* | 5/2019 | Igasaki | ................. | B23K 26/00 |
| 2019/0217414 A1* | 7/2019 | Hong | ........................ | B08B 5/04 |
| 2019/0224778 A1* | 7/2019 | Murphy | ............... | B23K 26/032 |
| 2019/0389008 A1* | 12/2019 | Furuta | ................ | B23K 26/0665 |
| 2020/0076402 A1* | 3/2020 | Koo | .................... | B23K 26/362 |

FOREIGN PATENT DOCUMENTS

| | | |
|---|---|---|
| CN | 105290612 A | 2/2016 |
| EP | 0927597 A1 | 7/1999 |
| WO | WO 1999028798 A2 | 6/1999 |

* cited by examiner

TRANSVERSAL LASER CUTTING MACHINE

FIELD

The invention relates to laser processing machines, and in particular, to laser processing machines for cutting plate-shaped workpieces.

BACKGROUND

In general, laser cutting machines include a workpiece support and a laser cutting head configured to focus a laser beam onto the workpiece. The laser cutting head is supported by a motion unit and can be displaced along the motion unit.

Typically, the motion unit of such laser cutting machines is arranged so as to be movable along a long side of the workpiece support, i.e. along the longer side of a rectangular plate-shaped workpiece, in what is known as a longitudinal laser cutting machine. U.S. Pat. No. 9,044,826 describes a longitudinal laser cutting machine in which the motion unit is supported from below, while International Patent Application Publication No. WO 1999/028798 describes a longitudinal laser cutting machine having a hanging motion unit, i.e. a motion unit that is supported from above. U.S. Pat. No. 5,402,691 describes a longitudinal laser cutting machine having a hanging motion unit that is suspended, at intermediate locations, from two top beams that extend along a long direction of a machine base and an asymmetrical center pull drive system that is used to move the motion unit along the top beams. However, in the longitudinal laser cutting machine provided in U.S. Pat. No. 5,402,691, large deflections of the motion unit between the supports occur because forces applied to the motion unit structure between the supports are comprised of inertial forces and X drive pull forces. In other laser cutting machines having a hanging motion unit configuration (such as those shown in U.S. Pat. No. 6,140,606, European Patent Document No. EP0927597A1, and Chinese Patent Document Nos. CN101301724A, CN105290612A, and CN203031122U), the motion unit is relatively short, but its high mass moves perpendicular to the direction in which the machine frame is most rigid (i.e., the motion unit moves in the weak direction of the machine) and thereby limits the dynamics and productivity of the machine.

As an alternative to longitudinal laser cutting machines, transversal laser cutting machines can be provided in which a motion unit is arranged so as to be movable along a short side of the workpiece support, i.e. along the shorter side of a rectangular plate-shaped workpiece. As compared to longitudinal laser cutting machines, conventional transversal laser cutting machines provide a number of advantages. For example, conventional transversal laser cutting machines provide improved access to the workpiece, the ability to load larger workpieces directly onto the machine, and improved visibility of the cutting process. Furthermore, conventional transversal laser cutting machines provide for a higher mass motion unit to be moved along the shorter side of the workpiece support while a lower mass laser cutting head is moved along the longer side of the workpiece support. However, as a result of the need for a longer motion unit that extends across the long side of the workpiece support (and therefore has a relatively greater mass), transversal laser cutting machines exhibit certain limitations because inertial forces resulting from movement of the motion unit can cause large deflections at the center of the motion unit. In order to improve machine dynamics and productivity in transversal laser cutting machines, an additional motion axis for the cutting head can be included to allow the cutting head to be moved in parallel with the motion unit. This is shown, for example, in U.S. Pat. Nos. 6,825,439 and 6,835,912.

SUMMARY

In an embodiment, the present invention provides a laser cutting machine. The laser cutting machine includes a first bearing structure and a second bearing structure, a first support structure and a second support structure, a bridge, and a laser head. Each of the first and second bearing structures includes a support structure interface. The first support structure is configured to engage the support structure interface of the first bearing structure and the second support structure is configured to engage the support structure interface of the second bearing structure. The bridge is attached to the first support structure at a first intermediate support region and to the second support structure at a second intermediate support region and is configured to move in a first direction. Each of the first intermediate support region and the second intermediate support region is disposed at a distance from a first end of the bridge and at a distance from a second end of the bridge. The laser head is configured to move along the bridge in a second direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following.

DETAILED DESCRIPTION

Figure 1:
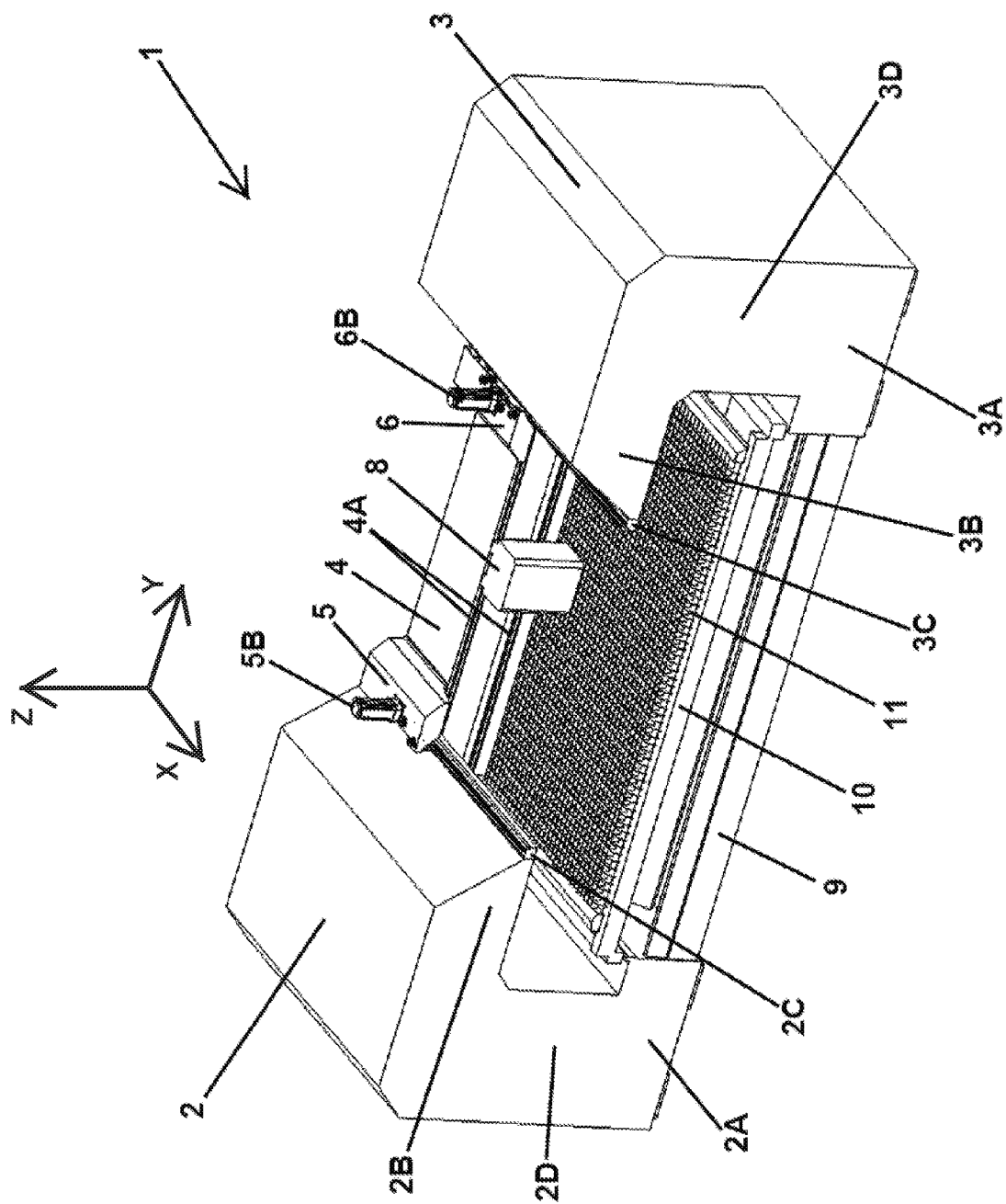
FIG. 1 is an isometric view of a transversal laser cutting machine according to an embodiment of the invention.

Embodiments of the present invention provide a transversal laser cutting machine having a bridge (commonly referred to in the literature as a motion unit and which can also be referred to as a laser head carrier) configured to move along a machine frame in a first direction defined by a first axis and a laser head configured to move along the bridge in a second direction defined by a second axis. The rigidity of the machine frame is greater in the first direction defined by the first axis than in the second direction defined by the second axis. First and second support structures are located above the bridge and are each attached to the bridge at an intermediate position located between first and second ends, in the second direction defined by the second axis, of the bridge.

Embodiments of the present invention thereby provide a number of advantages as compared to laser cutting machines of the prior art. In contrast to prior art transversal laser cutting machines, embodiments of the present invention provide for improved cutting quality by reducing deflection of the bridge and position shift of the laser head that is caused by inertial forces resulting from movement of the bridge. Therefore, embodiments of the present invention can generally improve the accuracy and precision of the cutting and can particularly improve the quality of the cutting of small intricate contours. Moreover, because of the reduced deflection of the laser head, more rapid movements of the bridge are possible. Furthermore, in contrast to prior art longitudinal laser cutting machines, embodiments of the present invention provide improved access to the workpiece, the ability to load larger workpieces directly onto the machine, and improved visibility of the cutting process. Therefore, embodiments of the present invention provide a unique combination of exceptional cutting performance and convenience of use.

Transversal laser cutting machines according to certain embodiments of the invention include a machine frame having a first bearing structure and a second bearing structure. Each bearing structure extends parallel to a first axis and includes a base and an overhang portion. A distance, measured in a direction parallel to a second axis, between a base of the first bearing structure and a base of the second bearing structure is greater than a distance, measured in the same direction, between an overhang portion of the first bearing structure and an overhang portion of the second bearing structure. Each overhang portion includes a support structure interface, i.e. an interface for a support structure. The support structure is configured to support a bridge carrying a laser head. The support structure interface extends parallel to the first axis and is configured to allow the support structure to move in a first direction parallel to the first axis. The support structure interface can be, for example, a guide rail.

Transversal laser cutting machines according to certain embodiments of the invention include a bridge extending in a second direction parallel to the second axis from a first end disposed below an overhang portion of the first bearing structure to a second end disposed below an overhang portion of the second bearing structure. The bridge is supported at a first intermediate support location by a first support structure disposed above the bridge and is supported at a second intermediate support location by a second support structure disposed above the bridge. Each of the first intermediate support location and the second intermediate support location lies between the first end of the bridge and the second end of the bridge, while the first intermediate support location lies closer to the first end of the bridge than to the second end of the bridge and the second intermediate support location lies closer to the second end of the bridge than to the first end of the bridge.

Transversal laser cutting machines according to certain embodiments of the invention include first and second support structures configured to engage and move along the support structure interfaces of the overhang portions of the first and second bearing structures, respectively. According to certain embodiments, the support structure interfaces are guide rails, and the first and second support structures are guide carriages. The first and second support structures can be either fixably or releasably attached to the bridge. For example, the first and second support structures and the bridge can be bolted together. In particular, the bolted connection can be configured to provide a degree of flexibility that accommodates thermal expansion of components of the laser cutting machine and that prevents serious damage to the laser cutting machine and the components thereof during a malfunction of drives that move the bridge.

Transversal laser cutting machines according to certain embodiments of the invention include a laser head configured to move along the bridge in the second direction from a first limit position at or near the first end of the bridge to a second limit position at or near the second end of the bridge. According to certain embodiments, a laser head housing or a laser head carrier plate supports the laser head and engages with the bridge. The bridge includes a laser head interface, and the laser head housing or carrier plate is configured to engage the laser head interface and to move along the bridge in the second direction. The laser head housing or laser head carrier plate includes a drive configured to provide a drive force that produces the movement of the laser head housing/carrier plate along the bridge. The laser head interface can be one or more guide rails that extend along the bridge in the second direction, and the laser head housing or laser head carrier plate can be a carriage configured to engage the guide rails. According to certain embodiments, the laser head housing or laser head carrier plate is further configured to move the laser head in a direction perpendicular to a plane defined by the first and second axes.

Transversal laser cutting machines according to certain embodiments of the invention include drives arranged on each of the first and second support structures or on each of the first and second bearing structures. The drives are configured to apply driving forces to the first and second support structures thereby causing the bridge to move in the first direction parallel to the first axis. In particular, the drives are synchronized so as to each provide an equivalent force to the bridge. As a result, any deflection of the bridge results only from inertial forces.

Transversal laser cutting machines according to certain embodiments of the invention have three different areas of maximum deflection of the bridge (as compared to a single area of maximum deflection in the middle of a bridge in prior art laser cutting machines). However, the magnitude of the maximum deflection of the bridge of transversal laser cutting machines according to embodiments of the invention is considerably less than the magnitude of the maximum deflection of the bridge in prior art laser cutting machines. According to certain embodiments of the present invention, the three areas of maximum deflection of the bridge are located at a center point between the first and second intermediate support locations and at each of the first and second ends of the bridge.

Transversal laser cutting machines according to certain embodiments of the invention can have first and second support structures that are positioned such that deflections of the bridge are the same at all three positions thereby minimizing overall structural deflections of the laser head. According to certain embodiments, the first and second support structures and/or the first and second intermediate support locations are located one third of the length of the bridge from respective ends of the bridge. Alternatively, the first and second support structures and/or the first and second intermediate support locations are located at positions identified through multiple iterations of dynamic stress analysis calculations. As a starting point for the calculations, the positions of the first and second support structures and/or the first and second intermediate support locations are one third of the length of the bridge from respective ends of the bridge. The calculations can also take into account the shape and rigidity of the first and second bearing structures.

According to an embodiment of the invention, a laser cutting machine is provided that includes a first bearing structure and a second bearing structure, each of the first and second bearing structures including a support structure interface. The laser cutting machine further includes a first bearing structure and a second bearing structure, each of the first and second bearing structures including a support structure interface, and a first support structure and a second support structure, the first support structure being configured to engage the support structure interface of the first bearing structure and the second support structure being configured to engage the support structure interface of the second bearing structure. The laser cutting machine additionally includes a bridge, the bridge being attached to the first support structure at a first intermediate support region and to the second support structure at a second intermediate support region and being configured to move in a first direction, and a laser head configured to move along the bridge in a second direction. Each of the first bearing structure and the second bearing structure includes an overhang portion. The support structure interface of the first bearing structure is located on the overhang portion of the first bearing structure and the support structure interface of the second bearing structure is located on the overhang portion of the second bearing structure. A first end of the bridge lies underneath the overhang portion of the first bearing structure and a second end of the bridge lies underneath the overhang portion of the second bearing structure. The overhang portion of the first bearing structure includes a chamfer that abuts the top surface of the first bearing structure, and the overhang portion of the second bearing structure includes a chamfer that abuts the top surface of the second bearing structure.

The laser cutting machine according to the embodiment of the invention can further include a laser head housing within which the laser head is disposed, wherein the bridge includes one or more guide rails extending in the second direction and wherein the laser head housing is a carriage configured to engage the one or more guide rails of the bridge. First and second gantry drives configured to provide a drive force to the bridge so as to cause the bridge to move along the support structure interface of the first bearing structure and along the support structure interface of the second bearing structure can also be provided. The support structure interface of the first bearing structure and the support structure interface of the second bearing structure can be guide rails. The first and second support structures can be carriages configured to engage the guide rail of the respective first bearing structure and the second bearing structure.

The laser cutting machine according to the embodiment of the invention can further include a connecting plate connected to each of the first bearing structure and the second bearing structure and a workpiece support having support slats disposed in a frame. The workpiece support has a length in the first direction and a width in the second direction, the width being greater than the length.

Figure 2:
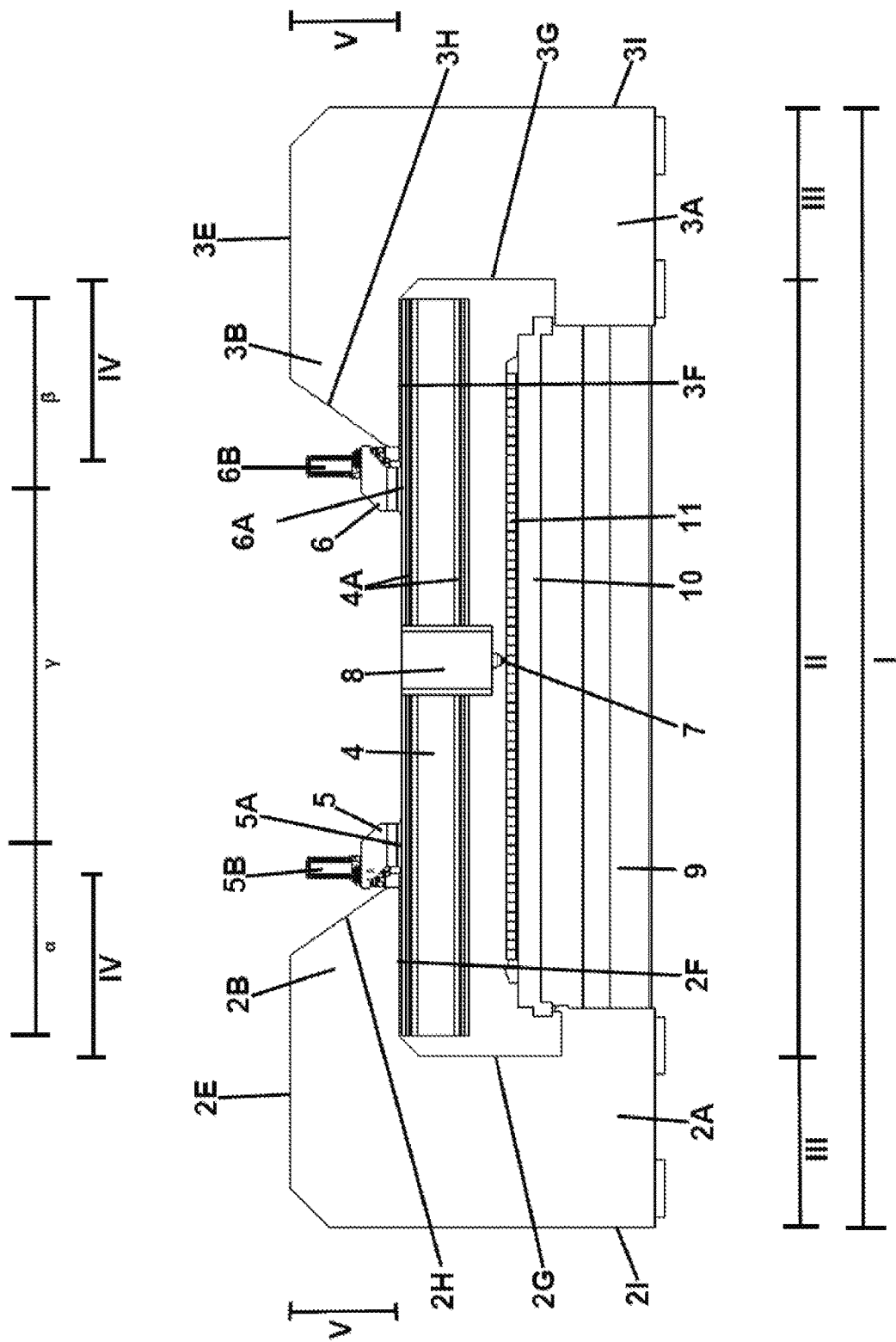
FIG. 2 is a front view of the transversal laser cutting machine of the embodiment of FIG. 1.

According to an embodiment of the invention (as depicted in FIGS. 1 and 2), a laser cutting machine 1 includes a machine frame with a first bearing structure 2 and a second bearing structure 3. The first bearing structure 2 includes a base 2A, an overhang portion 2B, and a support structure interface 2C, and the second bearing structure 3 includes a base 3A, an overhang portion 3B, and a support structure interface 3C. Each of the first bearing structure 2 and the second bearing structure 3 extend in a transverse direction of the laser cutting machine 1 parallel to a first axis X. In the embodiment of in the invention depicted in FIGS. 1 and 2, the first bearing structure 2 and the second bearing structure 3 are beams that form a portion of a machine frame of the transversal laser cutting machine 1. The beams can be formed from a variety of materials but are preferably formed of steel. The support structure interface 2C and the support structure interface 3C are guide rails that extend in the transverse direction along the first bearing structure 2 and the second bearing structure 3, respectively. The guide rails can also be formed from a variety of materials, but are preferably formed from high quality, hardened alloy steel.

Each of the first and second bearing structures 2 and 3 includes an intermediate section 2D and 3D, respectively. The first and second bearing structures also include, respectively, top surfaces 2E and 3E, overhang bottom surfaces 2F and 3F, intermediate section inner surfaces 2G and 3G, overhang portion chamfers 2H and 3H, and transversal side surfaces 2I and 3I. Additional chamfers are formed between the intermediate section inner surfaces 2G and 3G and the overhang bottom surfaces 2F and 3F, respectively, and between the top surfaces 2E and 3E and the transversal side surfaces 2I and 3I, respectively.

Each of the first and second bearing structures 2 and 3 has an extent in a direction parallel to the first axis X (i.e. the transverse direction) that is less than a distance I in a direction parallel to the second axis Y (i.e. the longitudinal direction) from the left end of the first bearing structure 2 to the right end of the second bearing structure 3. Furthermore, the extent of each of the first and second bearing structures 2 and 3 in the transverse direction is less than a distance II in the longitudinal direction from a right edge of the intermediate section 2D of the first bearing structure 2 to a left edge of the intermediate section 3D of the second bearing structure 3. Each of the first and second bearing structures 2 and 3 can be dimensioned so as to limit deformation of a bridge 4 and deflection of a laser head 8 and thereby provide for exceptional cutting performance. Specifically, in the embodiment depicted in FIGS. 1 and 2, the intermediate sections 2D and 3D have a width III that is equal to a width IV, in the longitudinal direction, of the overhang portions 2B and 3B (i.e. the width from the intermediate section inner surfaces 2G and 3G to the innermost extent of the overhang portions 2B and 3B). Moreover, the height V of the overhang portions 2B and 3B (i.e. the distance, in a third direction Z, from the overhang bottom surfaces 2F and 3F to the top surfaces 2E and 3E, respectively) is equal to 70% of the widths III and IV. In alternative embodiments, exceptional machining performance can also be realized with a ratio between the widths III and IV that ranges from 0.5 to 2, and preferably, from 0.67 and 1.5, from 0.75 to 1.33, or from 0.9 to 1.1, and with a ratio between the height V to the shorter of the width III and the width IV that ranges from 0.33 to 1.5, and preferably, from 0.5 to 1 or from 0.67 to 0.75.

The transversal laser cutting machine 1 also includes a bridge 4 that extends in a direction parallel to a second axis Y and that includes a laser head interface 4A. The bridge 4 is attached to each of a first support structure 5 (at a first intermediate support region 5A) and a second support structure 6 (at a second intermediate support region 6A), which are in turn connected to the first bearing structure 2 and the second bearing structure 3, respectively. Each of the first and second intermediate support regions 5A and 6A can include one or more points of attachment, and a center of the intermediate support regions 5A and 6A can be a line perpendicular to both the first axis X and the second axis Y that extends through a single point of attachment or that bisects a line that connects multiple points of attachment. The first and second support structures 5 and 6 include gantry drives 5B and 6B that are configured to apply drive forces to the bridge 4 so as to cause the bridge 4 to move in the transverse direction. The gantry drives 5B and 6B are synchronized so as to each provide an equivalent force, acceleration, and speed to the bridge 4. In the embodiment depicted in FIGS. 1 and 2, the bridge 4 is a bridge that can be formed of a variety of materials, preferably steel. The bridge can have bars welded thereto and the guide rails that form the laser head interface 4A can be bolted to the bars. Also in the embodiment depicted in FIGS. 1 and 2, the first support structure 5 and the second support structure 6 are guide carriages configured to engage the guide rails that are the support structure interfaces 2C and 3C and the gantry drives 5B and 6B include electric motors. The guide carriages are bolted to the bridge in a manner that provides a degree of flexibility that accommodates thermal expansion of various components of the laser cutting machine 1 and that prevents serious damage to the laser cutting machine and the components thereof should a malfunction of the electric motors that move the bridge occur.

In an embodiment, the center of the first intermediate support region 5A is located at a distance α equal to approximately one quarter of the length of the bridge 4 from the left end of the bridge 4 and the center of the second intermediate support region 6A is located at a distance β equal to approximately one quarter of the length of the bridge 4 from the right end of the bridge 4. Therefore, the distance α from the left end of the bridge 4 to the center of the of the first intermediate support region 5A and the distance β from the center of the second intermediate support region 6A to the right end of the bridge are equal. The distance γ from the center of the first intermediate support region 5A to the center of the second intermediate support region 6A is approximately two times longer than α or β. However, in alternative embodiments of the invention, the ratios of the distances α, β, and γ may vary. Specifically, exceptional performance can be realized with a ratio of the distances α:β that is maintained at 1:1 combined with a distance γ such that the ratio of the distances α:β:γ varies from 1:1:1.5 to 1:1:2.8 (i.e, α:γ varies from 0.35 to 0.67). Preferably, exceptional performance can be realized with ratios of the distances α:β:γ that vary from 1:1:1.67 to 1:1:2.5 (i.e., α:γ varies from 0.4 to 0.6), from 1:1:1.75 to 1:1:2.3 (i.e. α:γ varies from 0.43 to 0.57), or from 1:1:1.9 to 1:1:2.1 (i.e. α:γ varies from 0.47 to 0.52). In further alternative embodiments, the ratio of the distances α:β can also vary.

The transversal laser cutting machine 1 of FIGS. 1 and 2 additionally includes a laser head 7 and a laser head housing 8. The laser head housing 8 includes a bridge interface that is configured to engage with the laser head interface 4A of the bridge 4. The engagement of the bridge interface of the laser head housing 8 with the laser head interface 4A of the bridge 4 enables the laser head housing 8 to move in a direction parallel to the second axis Y from a left-most terminus (at which the laser head 7 is positioned at or beyond the left-most end of workpiece support 10) to a right-most terminus (at which the laser head 7 is positioned at or beyond the right-most end of the workpiece support 10). In order to generate this movement, a drive is provided, for example, as a component of the laser head housing. The drive can be, for example, an electric motor. In the embodiment depicted in FIGS. 1 and 2, the laser head interface 4A is formed of one or more guide rails, and the laser head housing 8 is a carriage configured to engage the guide rails that form the laser head interface 4A.

The transversal laser cutting machine 1 additionally includes a connecting plate 9 and a workpiece support 10, the workpiece support plate 10 having support slats 11 disposed in a frame for supporting a workpiece. The workpiece support 10 includes a rectangular frame that has a length in a direction parallel to the first axis X that is shorter than a length in a direction parallel to the second axis Y.

A stress analysis was carried out to measure the stress on and deformation of a bridge and the positional deviation of a laser head housing of a prior art longitudinal laser cutting machine and of a laser head housing of a transversal laser cutting machine according to an embodiment of the present invention. The bridge of the longitudinal laser cutting machine of is considerably shorter as compared to the bridge of the transversal laser cutting machine according to an embodiment of the invention. A maximum deflection of the bridge of the prior art longitudinal laser cutting machine occurred at the midpoint of the bridge and a maximum amount of stress was placed on that bridge at its midpoint. Maximum deflections of the bridge of the transversal laser cutting machine according to the embodiment of the invention (and maximum stress thereon) occurred at three different points: at the midpoint of the bridge and at either end of the bridge. However, the maximum deflection of said bridge and the maximum stress thereon does not exceed the corresponding maximums of the bridge of the prior art longitudinal laser cutting machine—despite the much longer length of the bridge of the embodiment of the present invention as compared to that of the prior art. As a result, the embodiment of the present invention provides exceptional machining performance (due to the small deviation of the laser head from its required position) and convenience of use (due to the machine geometry enabled by the increased bridge length).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A laser cutting machine, comprising:
a machine frame including a first bearing structure and a second bearing structure, each of the first and second bearing structures including a support interface;
a first support and a second support, the first support engaging the support interface of the first bearing structure and the second support engaging the support interface of the second bearing structure;
a bridge attached to the first support at a first intermediate support region and to the second support at a second intermediate support region and being configured to move in a first direction; and a laser head configured to move along the bridge in a second direction, wherein a length of the bridge is greater than a length of the first bearing structure and a length of the second bearing structure, and wherein each of the first intermediate support region and the second intermediate support region is disposed at a distance from a first end of the bridge and at a distance from a second end of the bridge.

2. The laser cutting machine of claim 1, further comprising a laser head housing within which the laser head is disposed, wherein the bridge includes one or more guide rails extending in the second direction and wherein the laser head housing is a carriage configured to engage the one or more guide rails of the bridge.

3. The laser cutting machine of claim 1, further comprising first and second gantry drives configured to provide a drive force to the bridge so as to cause the bridge to move along the support interface of the first bearing structure and along the support interface of the second bearing structure.

4. The laser cutting machine of claim 3, wherein the support interface of the first bearing and the support interface of the second bearing are guide rails.

5. The laser cutting machine of claim 4, wherein the first support is a carriage configured to engage the guide rail of the first bearing structure and the second support is a carriage configured to engage the guide rail of the second bearing structure.

6. The laser cutting machine of claim 1, further comprising a connecting plate connected to each of the first bearing structure and the second bearing structure.

7. The laser cutting machine of claim 1, further comprising a workpiece support plate having support slats disposed in a workpiece support frame, wherein the workpiece support plate has a length in the first direction and a width in the second direction, the width being greater than the length.

8. The laser cutting machine of claim 1, wherein each of the first bearing structure and the second bearing structure includes an overhang portion.

9. The laser cutting machine of claim 8, wherein the support interface of the first bearing structure is located on the overhang portion of the first bearing structure and wherein the support interface of the second bearing structure is located on the overhang portion of the second bearing structure.

10. The laser cutting machine of claim 8, wherein the first end of the bridge lies underneath the overhang portion of the first bearing structure and the second end of the bridge lies underneath the overhang portion of the second bearing structure.

11. The laser cutting machine of claim 10, wherein a distance from the first end of the bridge to a center of the first intermediate support region has a length $\alpha$ and a distance from the second end of the bridge to a center of the second intermediate support region has a length $\beta$, wherein a ratio of the length $\alpha$ to the length $\beta$ is equal to 1.

12. The laser cutting machine of claim 11, wherein a distance from the center of the first intermediate support region to a center of the second intermediate support region has a length $\gamma$, and wherein a ratio of the length $\alpha$ or of the length $\beta$ to the length $\gamma$ is between 0.35 and 0.67.

13. The laser cutting machine of claim 12, wherein the ratio of the length $\alpha$ or of the length $\beta$ to the length $\gamma$ is between 0.4 to 0.6.

14. The laser cutting machine of claim 13, wherein the ratio of the length $\alpha$ or of the length $\beta$ to the length $\gamma$ is between 0.43 to 0.57.

15. The laser cutting machine of claim 14, wherein the ratio of the length $\alpha$ or of the length $\beta$ to the length $\gamma$ is between 0.48 and 0.52.

16. The laser cutting machine of claim 10, wherein each of the first bearing structure and the second bearing structure further includes a base, an intermediate region connecting the base to the overhang portion, and a top surface, and wherein the intermediate region of the first bearing structure and the intermediate region of the second bearing structure each includes an inner surface.

17. The laser cutting machine of claim 16, wherein a first ratio of a width of the intermediate region of the first bearing structure in the second direction from a first transverse side surface of the laser cutting machine to the inner surface of the intermediate region of the first bearing structure and a distance from the inner surface of the intermediate region of the first bearing structure to the innermost extent of the overhang portion of the first bearing structure is between 0.5 and 2, and wherein a second ratio of a width of the intermediate region of the second bearing structure in the second direction from a second transverse side surface of the laser cutting machine to the inner surface of the intermediate region of the second bearing structure and a distance from the inner surface of the intermediate region of the second bearing structure to the innermost extent of the overhang portion of the second bearing structure is between 0.5 and 2.

18. The laser cutting surface of claim 17, wherein the first ratio is between 0.9 and 1.1, and wherein the second ratio is between 0.9 and 1.1.

19. The laser cutting machine of claim 16, wherein the overhang portion of the first bearing structure and the overhang portion of the second bearing structure each includes an overhang bottom surface, wherein a ratio of a height of the overhang portion of the first bearing structure as measured from the overhang bottom surface of the first bearing structure to the top surface of the first bearing structure to a distance from the inner surface of the intermediate region of the first bearing structure to the innermost extent of the overhang portion of the first bearing structure is between 0.33 and 1.5, and wherein a ratio of a height of the overhang portion of the second bearing structure as measured from the overhang bottom surface of the second bearing structure to the top surface of the second bearing structure to a distance from the inner surface of the intermediate region of the second bearing structure to the innermost extent of the overhang portion of the second bearing structure is between 0.33 and 1.5.

20. The laser cutting machine of claim 10, wherein the overhang portion of the first bearing structure includes a chamfer that abuts the top surface of the first bearing structure, and the overhang portion of the second bearing structure includes a chamfer that abuts the top surface of the second bearing structure.

* * * * *